United States Patent [19]

Kanesaka

[11] Patent Number: 4,598,863
[45] Date of Patent: Jul. 8, 1986

[54] FUEL INJECTOR

[75] Inventor: Hiroshi Kanesaka, Kawasaki, Japan

[73] Assignees: Usui Kokusai Sangyo Kabushiki Kaisha, Sunto; Kabushiki Kaisha Kanesaka Gijutsu Kenkyusho, Kawasaki, both of Japan

[21] Appl. No.: 570,911

[22] Filed: Jan. 16, 1984

[30] Foreign Application Priority Data

Jan. 20, 1983 [JP] Japan .................................. 58-6705
Apr. 25, 1983 [JP] Japan .................................. 58-71543
May 20, 1983 [JP] Japan .................................. 58-87688

[51] Int. Cl.$^4$ .............................................. F02M 41/16
[52] U.S. Cl. .............................................. 239/96; 239/94
[58] Field of Search .................................... 239/96, 94

[56] References Cited

U.S. PATENT DOCUMENTS

| | | |
|---|---|---|
| 1,951,340 | 3/1934 | Bohuslau . |
| 2,279,010 | 4/1942 | Nichols ............................ 239/94 X |
| 2,380,148 | 7/1945 | Camner ............................ 239/94 |
| 2,746,443 | 5/1956 | Meyer . |
| 2,778,351 | 1/1957 | Links . |
| 2,788,246 | 4/1957 | Nichols ............................ 239/96 |
| 2,997,994 | 8/1961 | Falberg . |
| 3,810,453 | 5/1974 | Wolfe . |
| 4,367,846 | 1/1983 | Akagi ............................ 239/96 |
| 4,469,069 | 9/1984 | Kuroyanagi . |

Primary Examiner—Joseph F. Peters, Jr.
Assistant Examiner—Daniel R. Edelbrock
Attorney, Agent, or Firm—Anthony J. Casella; Gerald E. Hespos

[57] ABSTRACT

A fuel injector is provided wherein an accumulating chamber is formed around a needle valve in a nozzle assembly housing to open and close an inlet port. An injection end control valve is disposed between the accumulating chamber and a fuel passage having communication with an atmospheric pressure side of the needle valve. The injection end control valve functions to introduce high-pressure fuel from the accumulating chamber into the atmospheric pressure side of the needle valve. Thus, rapid closing of the needle valve is enabled.

1 Claim, 23 Drawing Figures

FIG. 14
FIG. 15
FIG. 16
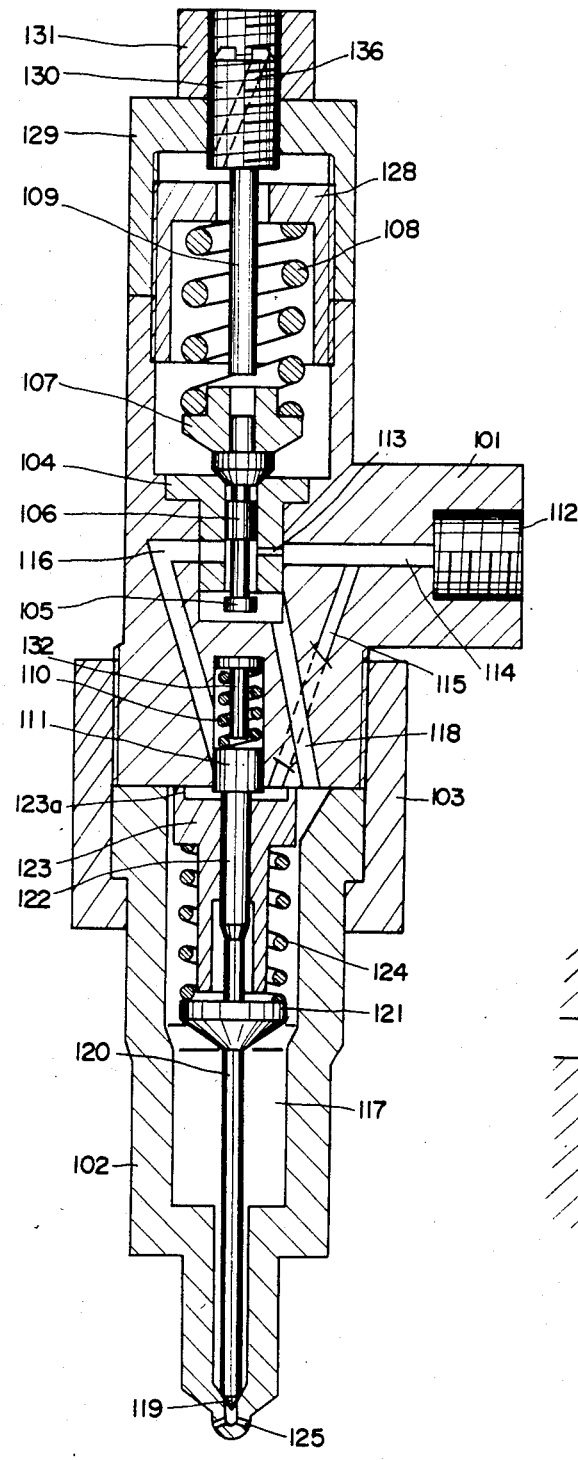
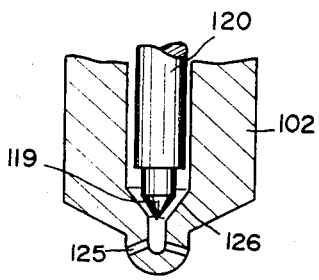
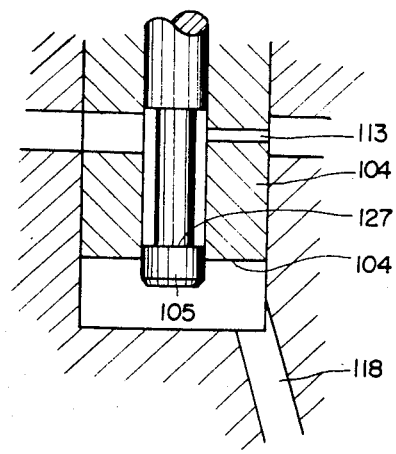

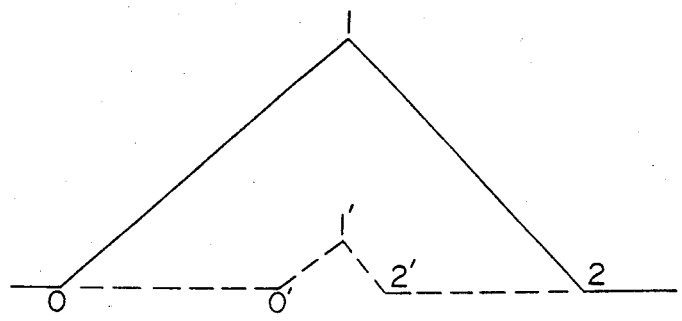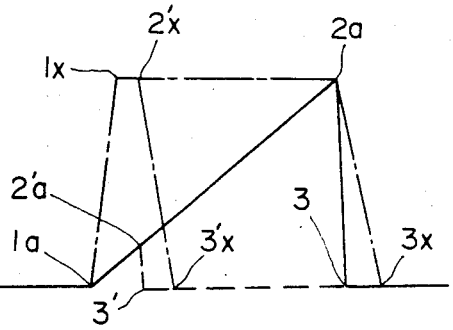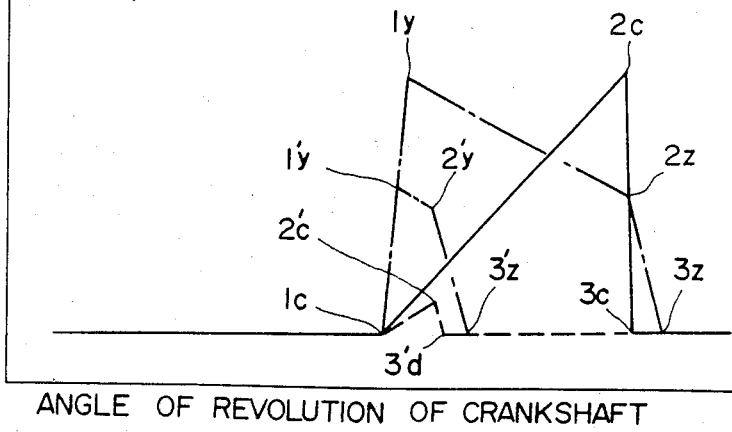
FIG. 21

FIG. 22
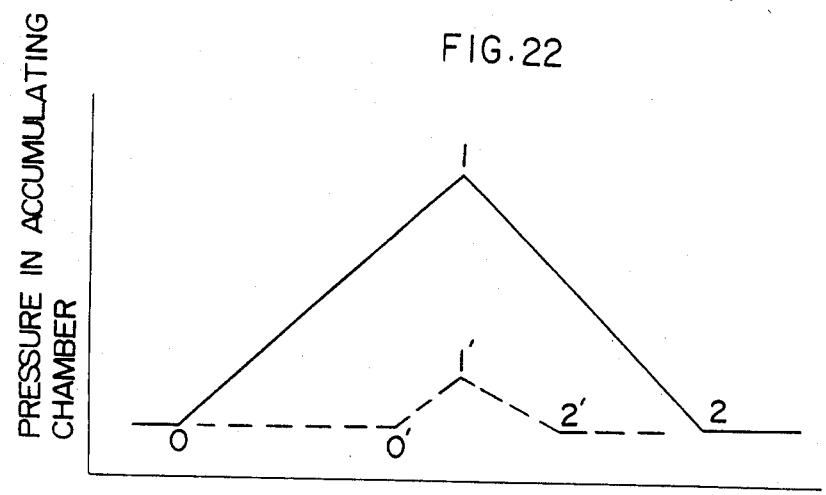
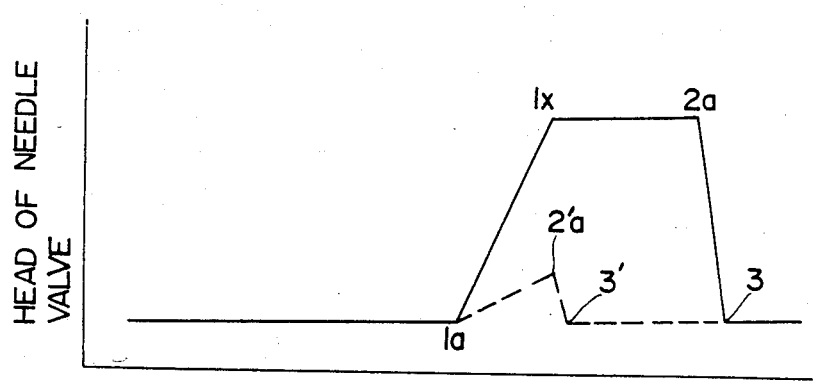
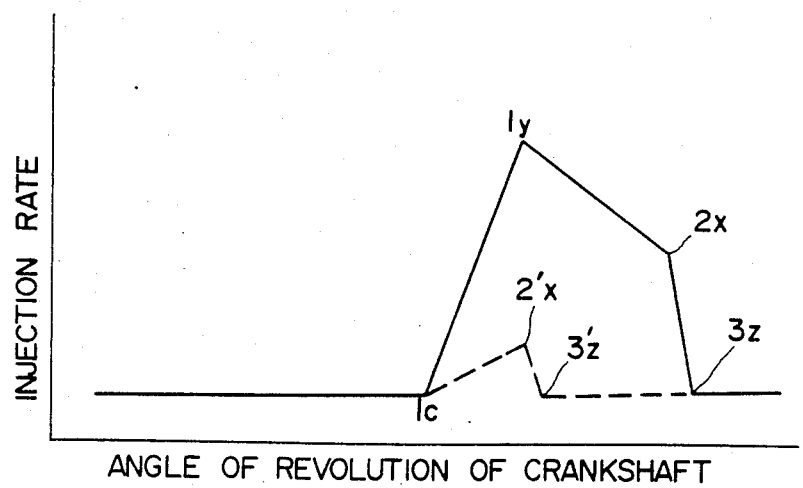

FUEL INJECTOR

BACKGROUND OF THE INVENTION

1. Field of the Invention

This invention relates to a fuel injector for a compression ignition engine (hereinafter referred to as a "diesel engine").

2. Description of the Prior Arts

In the conventional jerk or unit injector type injection device, a plunger is lifted by a rotating cam to compress and discharge fuel which is injected through a nozzle into a combustion chamber of the engine. The pressure and rate of injection are necessarily low at low engine speeds and high at a high engine speed so that the performance and thermal efficiency of the engine is reduced at the low speed.

To improve combustion efficiency, shorten the fuel injection period and enhance the isochoric degree with a view to further improving the thermal efficiency over the full range of engine speed and load, it is necessary to increase the injection pressure and rate. This is, however, difficult to achieve with prior art injection devices.

With the object of solving this problem, accumulating type fuel injecting devices have been developed. Several such devices have been put into practice but none are in common use.

One reason for this is that the accumulating type fuel injecting device with no booster is simple in construction and cheap but the injection period cannot be shortened to the extent desired. Further, it is difficult to reduce the minimum injection rate to the level required in small-sized diesel engine. In addition, although booster type accumulation fuel injecting devices with electronic control are capable of injecting high-pressure fuel within a short period, these are costly and not very reliable due to their complicated construction.

SUMMARY OF THE INVENTION

One object of the present invention to provide a high-pressure fuel injector which enables a drastic shortening of the injection period while avoiding the disadvantages of known accumulating type fuel injecting devices, which is useful for not only low- and medium-speed but also high-speed diesel engines, and the minimum fuel injection rate of which is low.

According to the present invention we propose an accumulating type fuel injector comprising a fuel passage between the fuel passage having communication with the atmospheric (closing) pressure side of a needle valve and an accumulating chamber, an injection end control valve which opens to introduce high-pressure fuel from the accumulating chamber into the atmospheric pressure side of the needle valve. Thus the opening and closing pressures of the needle valve are made equal while at the same time enabling rapid closing of the valve.

We also propose introducing a restriction or throttle imparting resistance to the flow of a fuel back through the high-pressure fuel supply passage and/or through a spill port as the needle valve opens. The restriction or throttle is disposed at the side of a fuel tank from a point wherein the injection end control valve communicates with the high-pressure fuel supply passage. Opening of the needle valve is therefore retarded enabling a reduction in the fuel injection rate at the beginning of the injection which in turn suppresses the pressure rising rate and the maximum pressure in the combustion chamber of the engine, so decreasing the engine noise, improving the reliability, suppressing the generation of nitrogen oxides and, reducing the minimum fuel injection, with the accumulating type fuel injection device of the prior art.

One embodiment of injector according to the invention, has a needle valve control piston larger in area than that of the sliding portion of the needle valve and to which the pressure in the fuel supply passage is applied, and a restriction or throttle interposed between the injection end control valve and the supply passage so as to retard opening of the needle valve, the needle valve control piston is subject to the high-pressure fuel in the accumulating chamber when the injection end control valve opens thereby to accelerate closing the needle valve whereby the needle valve is closed at a high speed to shorten the combustion period and to improve the thermal efficiency.

BRIEF DESCRIPTION OF THE DRAWINGS

Embodiments of the invention will now be described by way of example with reference to the accompanying drawings of which:

FIG. 14 is a cross-section of a further embodiment of injector;

FIG. 15 shows to an enlarged scale a port of the needle valve in the injector of FIG. 14;

FIG. 16 shows to an enlarged scale the spill port throttle arrangement in the embodiment of FIG. 14;

FIGS. 21 and 22 relate respectively to the embodiment of FIGS. 14 to 16 and FIGS. 17 to 19, in each case graphs illustrate the variation with the angular position of the engine crankshaft of the accumulating chamber pressure, the needle valve travel and the injection rate.

DETAILED DESCRIPTION OF THE INVENTION

Figure 1A:
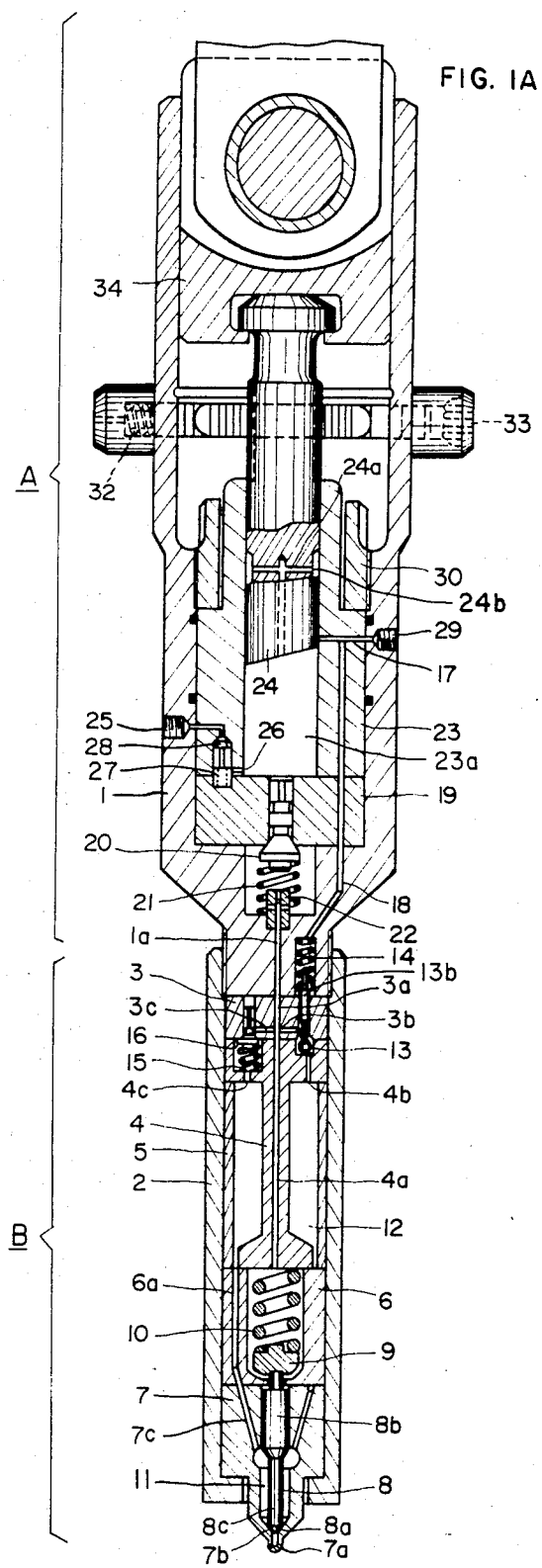
FIG. 1A is a cross-section of a first embodiment of fuel injector.

FIG. 1A shows a fuel injector comprising an injection pump unit A and a nozzle assembly B attached to the pump unit by an internal thread, in the end of the nozzle assembly housing 2, engaging a screw-threaded boss on an end of the injection pump unit housing 1. Within the nozzle assembly housing 2 are press-fitted a control valve member 3, a spacer 4, an accumulating cylinder 5, a spacer 6 and a needle valve member 7. A leading end of the needle valve member 7 projects from the housing 2 and is formed with an injection port 7a, which is opened and closed by a needle valve 8 having a contact face 8a co-operating with a valve seat 7b on the valve member. This needle valve 8 has a shaft portion 8b which is slidable in a bore of the needle valve member 7 and to the upper end, of which is fixed a spring bearing 9, on which a spring 10 within the spacer 6 bears to bias the needle valve 8 toward the closed position wherein the valve face 8a engages the valve seat 7b.

A fuel passage 7c within the needle valve member 7 communicates between a chamber 11 surrounding the outer circumference of a smaller-diameter portion 8c of the needle valve, and a fuel passage 6a leading through the spacer 6 to an accumulating chamber 12 in the accumulating cylinder 5.

Figure 1B:
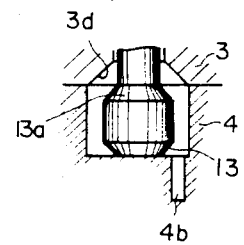
FIG. 1B shows in cross-section a detail of the injector of FIG. 1A.

The spacer 4 the lower end of which retains the spring 10, has passages 4b and 4c each communicating between the accumulating chamber 12 and fuel passage 3a in control valve member 3, respectively via branch passages 3b and 3c. This passage 3a also communicates between a fuel passage 1a in the sheath 1 and a fuel passage 4a leading to the closing pressure side of the needle valve 8. An injection end control valve 13 which is disposed between passages 3b and 4b has a shaft portion 13b slidably fitted in the control valve member 3 and a head portion 13a as shown in FIG. 1B. The control valve is biased by a compression spring 14 which is disposed in the sheath 1, towards an open position wherein the valve head abuts the spacer 4. When the valve lifts toward the closed position, the head abuts a valve seat 3d so closing off communication between the passages 3b and 4b.

Also mounted to the control valve member 3 is a check or non-return valve 16 biased by a compression spring 15 which acts to prevent reverse flow of fuel from the accumulating chamber 12 through passages 4c and 3c. Moreover, fuel leaking from the sliding faces of the control valve member 3 and the injection end control valve 13 is returned to the closing pressure side by way of a fuel return passage 18 in communication with a spill port 17.

There is no difference in the operation of the fuel injector if the fuel pump in the sheath 1 is of the well-known Bosch type one and has a plunger of negative lead.

A suction return valve 20 biased by a compression spring 21, is loosely fitted in a suction valve member 19 and acts as a check valve. Movement of the valve in opposition to the spring is limited by a stopper 22.

The plunger 24, which is slidable within a barrel 23, has a positive lead and the same construction as that of the known Bosch type.

In the barrel 23, there is interposed between a fuel inlet 25 and a fuel passage 26, a check valve 28 biased by a spring 27 and acting to prevent the reverse flow of fuel from the passage 26 to the inlet 25.

Midway along the barrel 23 is a spill port 17, and the fuel return passage 18 having communication with the spill port 17 prevents establishment of a back pressure in the injection end control valve 13 thereby to return the fuel therefrom through a fuel return port 29 to a fuel tank (although not shown) or the fuel inlet 25. O-ring seals are provided on the sheath 1 to bear upon the barrel 23 so as to seal between the inlet port 25 and return port 29 and between the return ports and atmosphere.

The barrel 23 and the suction return valve member 19 are retained in the sheath 1 by a threaded collar 30.

The plunger 24 having absolutely the same construction as that of the Bosch type, is jointed and driven in a rotatable manner by a cross head 34, which is fitted in a vertically movable manner within the upper end of the sheath 1. The supply of fuel by the injection pump unit A terminates when, during movement of the plunger 24 within the barrel 23, the leading face of the notch or groove 24b is aligned with the spill port 17, so establishing communication between the barrel 23 and the fuel return port 29 along passages 24a, notch 24b, spill port 17. The notch or groove 24b is inclined to the normal to the axis of the plunger in order to permit adjustment of the start of injection, as will be described later.

Figure 2:
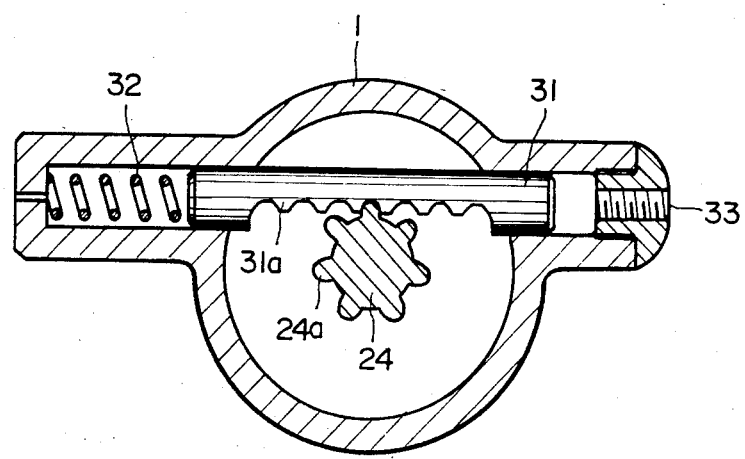
FIG. 2 is a cross-section of an injection timing mechanism forming part of the injector of FIG. 1A.

The injection start timing mechanism shown in FIG. 2 includes an adjusting rod 31 which is slidably carried in the sheath 1 and is formed with a rack 31a, meshing with a pinion 24c formed on the plunger 24. The position of the adjusting rod 31 and hence the angular position of the plunger, is determined by oil pressure applied to an inlet 33 and acting in opposition to spring 32, thereby to determine the injection timing as described below.

In operation, fuel is fed from a metering fuel pump (e.g. the PT pump of Commines Co. Ltd., or an electronically controlled metering fuel supply pump), to the fuel inlet 25 and passes via check valve 28 and passage 26 into the chamber 23a in the barrel 23.

As the plunger 24 advances from its top dead centre, check valve 28 closes so that the pressure in chamber 23a increases to open the suction return valve 20 so that fuel is pumped along passages 1a, 3a and 4a.

The injection end control valve 13 is held open by the spring 14 so that fuel from the passage 3a flows via the passage 3b, the injection end control valve 13 and the passage 4b and enters the accumulating chamber 12.

When the pressure in the accumulating chamber 12 reaches a predetermined value e.g. 1,000 atms, sufficient to overcome the spring 14, the injection end control valve 13 closes to shut-off communication between the passages 3b and 4b.

After closure of the injection end control valve 13, fuel enters the accumulating chamber through the check valve 16 (and passages 3c and 4c) so that the stored fuel is further compressed, the high pressure being applied along passages 6a and 7c to the lower part of the needle valve 8.

An equally high fuel pressure in passage 4a is applied to the upper side (i.e. the atmospheric pressure side) of the shaft portion 8b of the needle valve, the resulting force together with the force in spring 10 holding the needle valve 8 firmly closed thereby to prevent leakage of fuel from the injection port 7a.

In accordance with the engine timing, the plunger 24 is further depressed until the desired maximum pressure (typically 2,000 atms) is reached.

At this time, the communication between the passage 24a and the spill port 17 is established by the leading edge of notch face 24b so that fuel under pressure in the chamber 23a flows along passage 24a through the spill port 17 and out to the fuel return port 29. This causes the suction return valve 20 to close which, due to its suction returning action in turn creates an abrupt drop in pressure in the passages 1a, 3a and 4a so that high pressure acting on the shaft portion 8b to hold the needle valve closed disappears. When this occurs, the pressure of fuel in the accumulating chamber 12 acting upon the difference in area between the shaft portion 8b and the lower portion 8c of the needle valve 8, (a smaller area than the upper end of shaft portion 8b) is sufficient to overcome the force in spring 10 and lift the needle valve 8a from its seat 7b to produce a gap through which fuel is injected from the injection port 7a into the engine combustion chamber. As fuel is injected, the pressure of the accumulating chamber 12 drops until at about 1000 atms, the injection end control valve 13 opens admitting fuel from the accumulating chamber 12 to flow through the passages 4b and 3b into the passages 3a and 4a.

Since the suction return valve 20 is closed, fuel cannot escape so that the pressure in passage 4a equalises with that in the accumulating chamber, this pressure being applied to the atmospheric pressure side (i.e. the upper end of the shaft portion 8b) of the needle valve 8, thereby to abruptly close the needle valve 8.

Once the needle valve 8 is lifted from its seat, the fuel pressure is also applied to the valve face 8a, the face tending to lift the valve this being suddenly augmented to ensure rapid valve opening. So far as concerns opening of the needle valve, conventional fuel injection devices operate as described above. However, during injection after opening, the pressure in the accumulating chamber of a conventional injector decreases gradually so that the needle valve 8 closes gradually. This is in contrast to the present invention, in accordance with which an injection end control valve is provided to enable abrupt valve closure.

Figure 3:
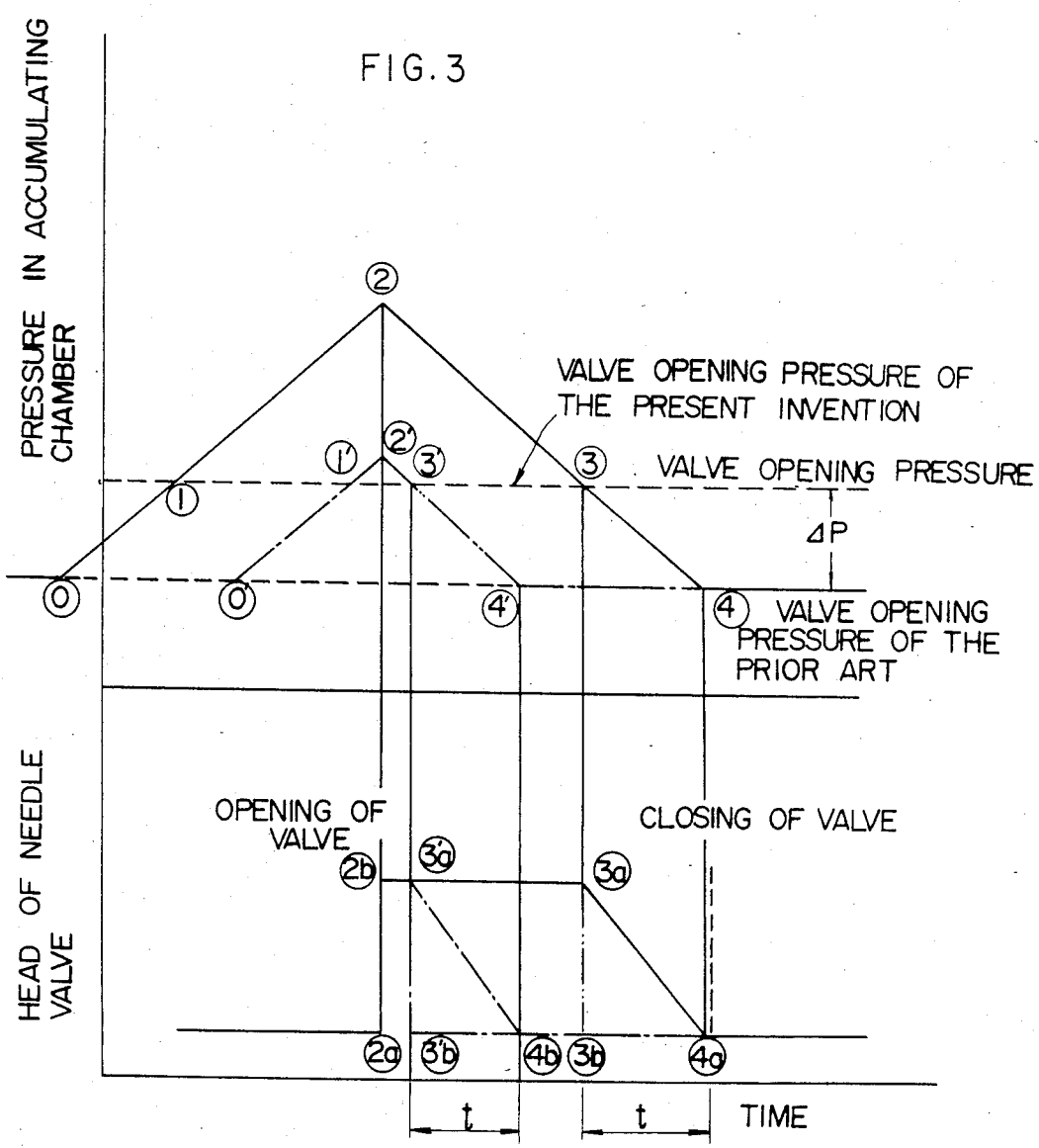
FIG. 3 is a graph showing the variation of accumulating chamber pressure and needle valve travel respectively plotted against time.

The graphs shown in FIG. 3, illustrate the change in accumulating chamber pressure with time. The pressure in the accumulating chamber rises along (0)–(2) as fuel is supplied from the injection pump unit A by the action of the plunger 24, and drops continuously when injection begins, until injection is completed, when the pressure reaches the valve closing level at (4). One disadvantage of conventional accumulating type fuel injecting devices is that, as the pressure in the accumulating chamber drops in accordance with the injection rate, the needle valve 8 is depressed by the spring 10 so gradually reducing the valve head. The valve does not close before the pressure reaches the valve closing level, whereby the injection period is increased, as indicated by letter t, thus dissatisfying the purpose of high injection rate. Another disadvantage is that the valve opening pressure is expressed by the following equation:

Valve Opening Pressure =

$$\frac{\text{Force of spring 10}}{\text{Needle Valve 8 (Area of 8b - Area of 8c)}}$$

and that the valve opening pressure is expressed by the following equation as a result that the pressure is applied to the valve face 8a simultaneously with the opening operation of the valve:

$$\text{Valve Opening Pressure} = \frac{\text{Force of spring 10}}{\text{Area of Valve Portion 8b}}$$

If the above two equations are compared, the valve opening pressure is naturally low, the pressure difference of which is the injection rate of the accumulating type fuel injecting device, as has been described hereinbefore, and the minimum fuel injection rate is determined by the above-specified pressure, as indicated at ΔP of FIG. 3. This injecting device cannot effect the fuel injection at a minute rate not higher than the injection rate based upon the difference in the valve opening and closing pressures. For example, even if injection begins at a pressure (2′) slightly higher than the valve opening pressure, as shown in FIG. 3, it does not end at the point (3′) but continues until the point (4′). In a fuel injection such as shown in FIG. 1 having an injection end control valve 13, however, the same pressure is applied to both the upper and lower sides of the needle valve 8 immediately the control valve 13 opens, so that the needle valve 8 is accelerated toward the valve seat 7b by the force of the spring 10 irrespective of the pressure in the accumulating chamber 12. There is therefore a dramatic increase as compared with conventional injectors, in the rate at which the needle valve closes so that the fuel injection period is shortened and a high injection rate is possible.

This is illustrated in FIG. 3: when the pressure in the accumulating chamber reaches the point (2) so that the spill port 17 opens, there is a step change (2a–2b) in the head of the needle valve so that the needle valve opens instantly. When the injection end control valve 13 opens at the point (3), another step change in the valve head occurs from ((3a) to (3b)) so that the valve also closes instantly. In the absence of an injection end control valve 13, the change and hence closing of the valve would be gradual (from (3a) to (4a)).

The valve opening pressure can be made the same as the valve closing pressure to enable a low fuel injection with the low pressure difference depicted by (2′)–(3′) in FIG. 3, if:

$$\frac{\text{Force of Spring 14}}{\text{Area of Portion 13b of Control Valve 13}} = \frac{\text{Force of Spring 10}}{(\text{Area of Valve Portion 8b}) - (\text{Area of Valve Portion 8c})}$$

The effect of using an injection end control valve 13 is clearly illustrated in FIG. 3 which compares the change throughout the injection cycle of the valve head in an injector according to the present invention, (2a-2b-3′a-3′b) and in a conventional injector (2a-2b-3′a-3′b). When designing the injector, the respective masses are made small in comparison with the spring constants.

As described above, injection begins when communication is established between the interior of the barrel 23 and the spill port 17 (via the notch 24b and passages 24a). In the embodiment of FIGS. 1 and 2, the notch or groove 24b is inclined to the normal to the axis of the plunger so that the injection start timing can be adjusted by turning the plunger 24 to vary the stroke of the plunger 24 necessary to bring the notch 24b into communication with the spill port. This is achieved by the injection start timing mechanism, the input 33 of which is connected to the governor (not shown) operable to generate an oil pressure in accordance with the engine speed and load. Spring 32 is compressed to an extent determined by the applied pressure, so moving the rack 31a in mesh with the pinion 24, to set the plunger 24a in an angular position appropriate to the desired fuel injection start timing for any given engine speed and load.

It is considered that the injection rate is affected by a change in the injection timing but by connecting the fuel return port 29 and the fuel inlet 25 the fuel injection rate is not changed significantly.

Incidentally, in the unit injector known in the prior art, the injection timing adjustment requires a complex and expensive construction and is not commonly adopted. Despite this fact, the injection timing can be changed without any difficulty.

Figure 4:
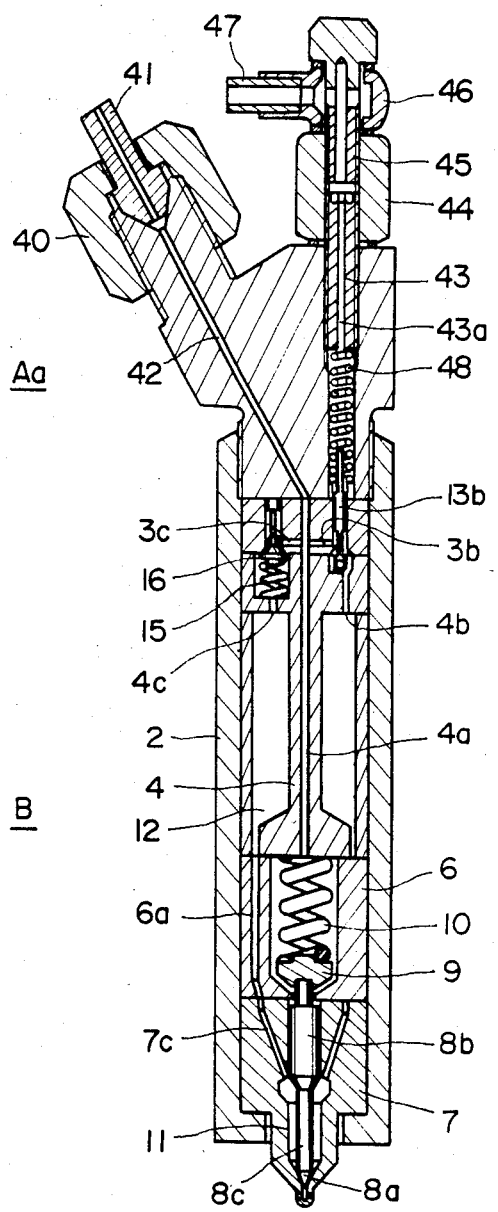
FIG. 4 shows in cross-section another embodiment of fuel injector.

FIG. 4 shows another embodiment of fuel injector according to the invention, in which the nozzle assembly B is the same as the nozzle assembly B in FIG. 1, the component parts thereof being identified by the same reference numerals. In this embodiment, however, the injection pump, which is not shown, supplies the high pressure fuel through a pipe 41, which is connected to an injection pump unit Aa by means of a nut 40. The injection pump unit Aa is screwed into the nozzle assembly housing 2 and is formed with a fuel passage 42 through which fuel flows into the accumulating chamber 12. Fuel leaking through the clearance between the shaft portion 13b of the injection end control valve 13 and the bore of the control valve member 3, flows through a passage 43a in an adjusting screw 43 of the pump unit body Aa, through a connecting bolt 45 secured by a lock nut 44, through an eye joint 46 attached to the connecting bolt 45 and through a fuel return pipe 47 to the fuel tank or the injection pump (not shown).

The opening pressure of the injection end control valve 13 is adjusted by turning the adjusting screw 43 to vary the load in a spring 48. Once adjusted, the screw 43 is held in position by a lock nut 44.

The injection pump (not shown) may be of the Bosch type referred to above or the kind described with reference to FIG. 1.

Figure 5:
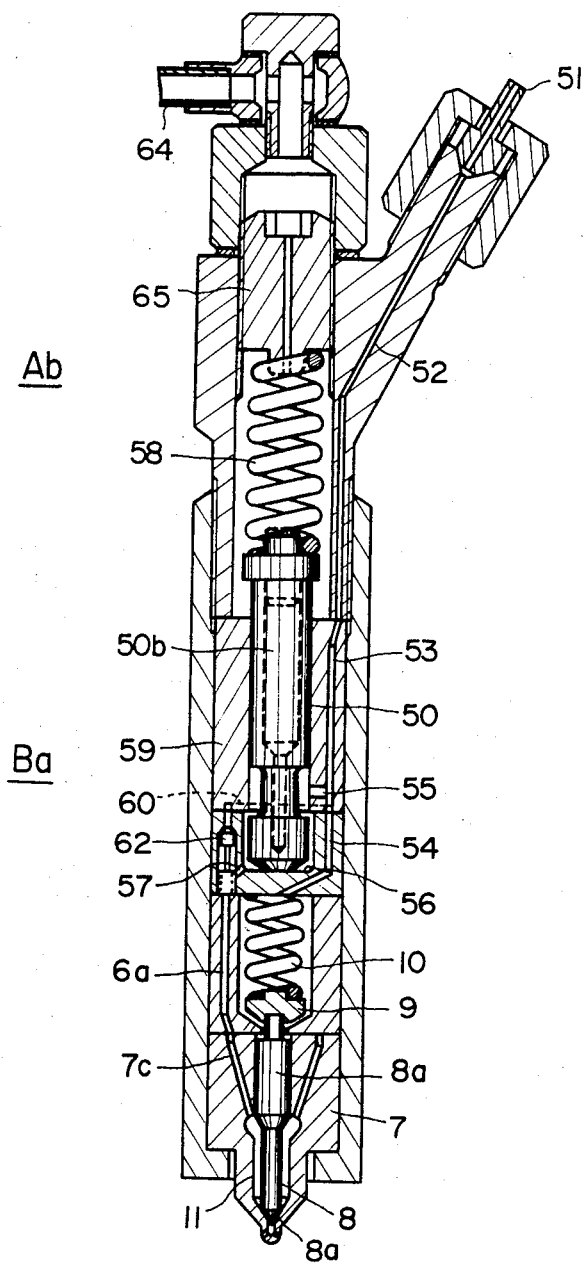
FIG. 5 shows in cross-section a further embodiment of fuel injector.
Figure 6:
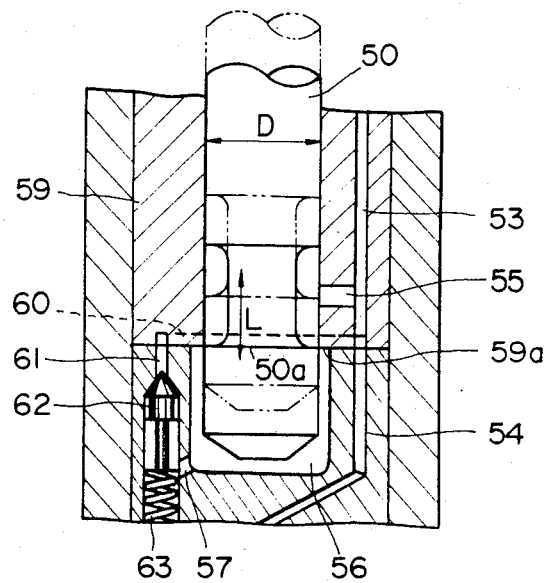
FIG. 6 shows to an enlarged scale a port of the injector of FIG. 5.
Figure 7:
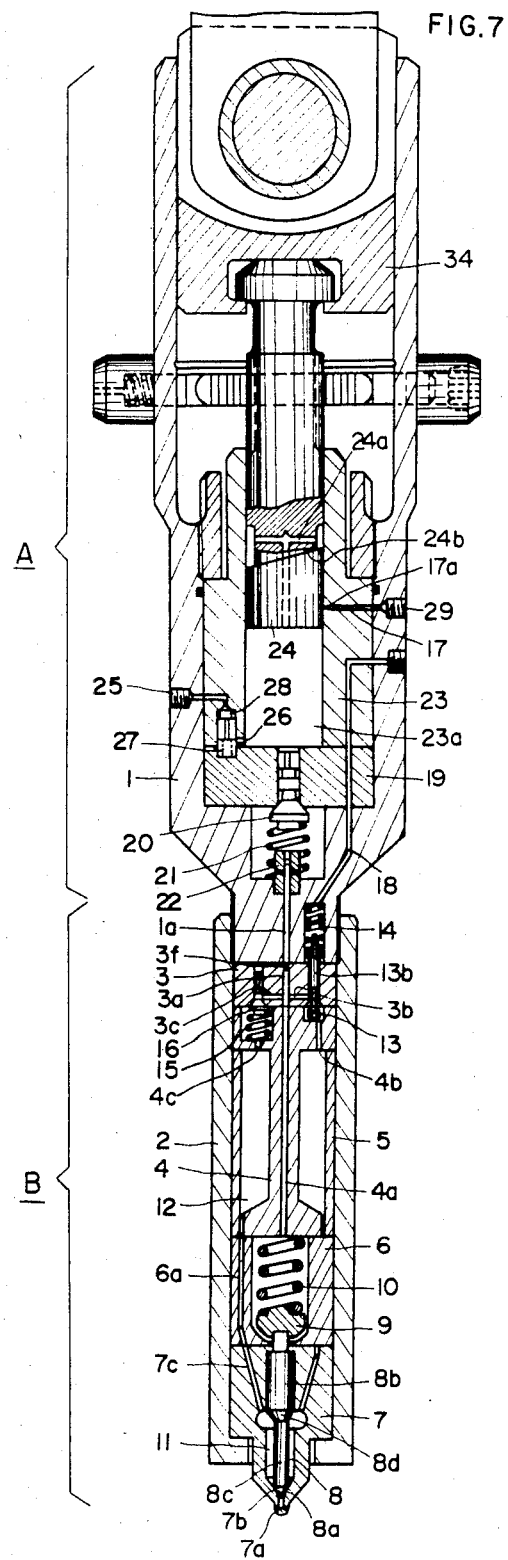
FIG. 7 shows in cross-section a modified form of the injector of FIG. 1.

As in the embodiment of FIG. 4, the fuel injector shown in FIGS. 5 and 6 has a fuel injection pump unit or adapter Ab for connection by pipes to the injection pump (not shown).

High pressure fuel from the fuel injection pump (not shown) is supplied along a high-pressure pipe 41 and enters a fuel passage in the injection pump unit Ab, leading via passages 53 and passage 54 to the spring 10 chamber in the spacer 6, the pressure acting on the portion 8b of the needle valve 8 in the sense to close the needle valve.

Fuel also passes via a branch passage 55, into a chamber 56 of the injection end control valve 50 (when open), and from there through the fuel passages 57a, 6a and 7c into the chamber 11 around the needle valve 8.

The force tending to close the needle valve 8 (i.e. the force of the spring 10 plus the product of the fuel pressure and the areas of the needle valve portion 8b) is greater than the force tending to lift the needle valve 8, (i.e. the product of the fuel pressure and the area of the needle valve portion 8b of the needle valve minus the area of the needle valve portion 8c), so that the needle valve remains closed.

As the head of the plunger of the fuel injection pump increases so the pressure in the respective fuel passages is boosted so that the lower end of the injection end control valve 50 which is exposed to the pressure, moves upwardly in opposition to the spring 58. When the injection end pressure is reached, the end face 50a of the injection end control valve 50 contacts the end face 59a of a control valve member 59, (se FIG. 6) so as to shut off communication between the passages 55 and 57.

Fuel then passes through the fuel passages 53, 60 and 61 (as shown in FIG. 6) causing the check valve 62 to open against the force of a spring 63, whereupon high pressure fuel flows back through the passage 57 and is applied beneath the fuel injection end control valve 50 and via passages 6a and 7c to the lower portion of the needle valve 8.

The increase in volume of the chamber 56 due to travel of the injection end control valve 50 (i.e. $\pi/4 \cdot D^2 \times L$, where D is the diameter of the control valve 50 and L is the control valve travel as indicated in FIG. 6) is the injection rate of the nozzle.

When the spill port of the injection pump (not shown) is opened, the high pressure in the passages 52, 53 and 54 is reduced by the suction return valve so that the pressure above the needle valve 8 is also reduced, causing the needle valve to open to start the fuel injection. At this time, the check valve 62 is closed by the pressure in the passage 6a so that the injection end control valve 50 is depressed by the spring 58.

Following injection at a desired rate by the travel L of the injection end control valve 50 of FIG. 6, the pressure in the chamber 56 reaches the opening pressure of the injection end control valve so that the valve returns to the position indicates by solid lines in FIG. 6, (despite the fact that the check valve 62 is closed), and the end faces 50a and 59a separate to open the valve.

At the same time, the fuel under pressure in the chamber 56 flows back through the passages 55 and 54 to act upon the upper end of the needle valve portion 8b so causing abrupt closing of the valve 8 to terminate injection.

A leak-off valve 64 returns the fuel, leaking past the portion 50b of the injection end control valve 50, to the fuel tank (not shown).

The pressure at which the injection end control valve 50 operates to terminate injection can be adjusted by means of a screw 65.

In the above described embodiment the chamber 56 and passages 6a and 7c serve as an accumulating chamber in which fuel is compressed. Alternatively, a large accumulating chamber may be provided to share the accumulating rate between that accumulating chamber and the injection end control valve.

In all of the above described embodiments the injection period can be shorted by closing the needle valve of the nozzle forcibly and abruptly while making the valve opening and closing pressures of the nozzle equal by the use of the injection end control valve. As a result, the injection rate can be increased together with the thermal efficiency. Since an extremely low injection can be effected, direct injection into a small-sized diesel engine (e.g. a diesel engine for a passenger car) is possible while facilitating adjustment of the injection rate.

In the accumulating type of injector, the injection pressure is constant over the speed range and, at the low speed, the injection rate is much improved yielding better performance and the thermal efficiency.

With high-pressure injection it is possible to augment the thermal efficiency and to reduce black smoke and nitrogen oxides in the engine exhaust gases.

In all of the above described embodiments a step change occurs in the pressure applied to the upper (i.e.

atmospheric pressure) side of the needle valve 8 when the spill port 17 opens. This step change in the said pressure causes virtually instantaneous opening of the valve with the result that the injection rate is, at least initially, high. The injection rate at onset of injection can, however, be adjusted by providing a throttle or restriction to retard the flow of fuel toward the return outlet 29.

In the embodiment of injector shown in FIGS. 7 to 10 the fuel passage 3a has a restriction 3f on the fuel injection pump side of the junction between the passages 4a, 3a and 3b and the spill port 17 has a restriction 17a providing resistance to the flow of fuel to the return port 29.

When in operation of the injector shown in FIGS. 7 to 10, communication is established between the spill port 17 and the chamber 23a (via the notch 24b and passages 24a in the plunger 24), the flow of fuel to the return port 29 is subject to the resistance introduced by the restriction 18a so that the pressure in chamber 23a drops gradually.

Consequently, closure of the suction return valve 20 is gradual so that the pressure in the passages 1a, 3a and 4a which acts on the atmospheric pressure side of the needle valve 8, drops slowly. It will be understood that the gradual reduction in pressure results in a gradual lifting of the needle valve and that, as a result immediately following the start of the fuel injection, only a restricted opening is available between the valve face 8a and the valve seat 7a. The fuel injection rate is therefore low initially and increases gradually with further travel of the needle valve in response to the reduction in the pressure acting on the atmospheric pressure side thereof.

Once the pressure of fuel in the accumulating chamber drops to 1000 atms the injection and control valve 13 opens so that fuel at this pressure flows back through the passages 4b and 3b into the passages 3a and 4a.

Since the suction return valve 20 is closed, the fuel passage 4a acquires the same pressure as that in the accumulating chamber 12, so that the needle valve closes. The restriction 3f in the passage 3a between the passage 3b and the suction return valve 20, causes the pressure waves to be reflected along the passage 4a onto the needle valve 8 so that the needle valve 8 responds rapidly and is closed within a short time period.

In the embodiments of FIGS. 1 to 6 which do not have the restriction 3f, the pressure acting on the atmospheric pressure side of the needle valve 8 does not rise until the fuel in the passage 1a has been compressed following opening of the injection and control valve 13. As a result, the rate at which the pressure acting on the atmospheric pressure side of the needle valve 8 rises determined inter alia by the length and volume of the passage 1a and the effect upon the closing speed of the needle valve may be significant especially with injectors in which the passage 1a is replaced by a long injection pipe.

In FIG. 6 the solid line 0–1 indicates the pressure rise during the accumulation in the accumulating chamber 12. Since the flow rate during accumulation is low, little resistance to flow is provided by the restriction 3f during accumulation.

As described above with reference to FIGS. 1 to 6, opening of the spill port in an injector without restrictions 3f and 17a causes an abrupt reduction of the pressure in the passage 4a with the result that the needle valve 8 opens abruptly, as indicated by the dotted line, 1a to 1x, and that the injection rate is abruptly increased from zero (point 1c) to 1y. The pressure in the accumulating chamber then drops from point 1 to point 2, so that the injection rate also decreases along a line 1y-2z.

Figure 12:
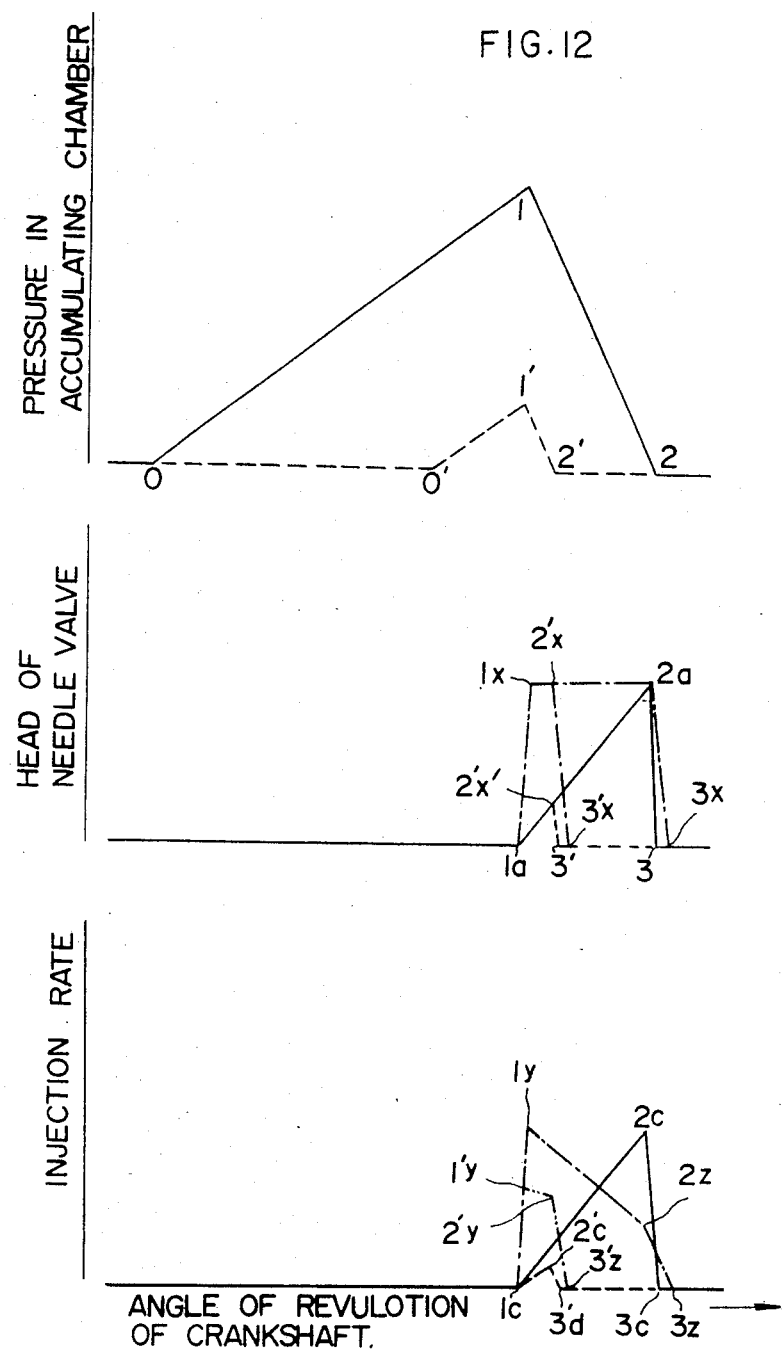
FIGS. 12 and 13 are graphs relating respectively to the embodiments of FIGS. 7 to 10 and FIG. 11, illustrating in each case the variation in accumulating chamber pressure, needle valve travel and injection rate, with the angular position of the engine crankshaft.

In contrast, the restrictions 3f and 17a impart a resistance to flow so that the pressure drop is gradual and the needle valve 8 is lifted slowly, as indicated by the solid line 1a-2a in FIG. 12, yielding an injection rate which is low initially and decreases with the needle valve 8 travel, as indicated by the solid line 1c-2c.

Thus, the low initial fuel injection enables a small quantity of the fuel to be ignited in the combustion chamber and burn in accordance with the injection rate. The rate of increase in pressure within the combustion chamber is much reduced with the result that the engine generates less noise, stresses are reduced due to the low combustion pressure, and the lower combustion temperature suppresses the generation of the nitrogen oxides. And, the needle valve 8 is closed gradually along the solid line 2a-3x. The injection rate at this time is indicated by a single dotted line 2z-3z so that the needle valve 8 is closed at the point 3x.

Due to the restriction 3f, the needle valve closes more rapidly (along solid line 2a-3) and the injection rate falls off more rapidly (along the solid line 2c-3c) than with an injector such as described in FIGS. 1 to 6, in which injection valve closure and injection rate are indicated respectively by the dotted lines 2a-3x and 2z to 3z in FIG. 12.

From the above it will be clear, that the restrictions make it possible to increase the needle valve closing speed, to shorten the fuel injection period and to ensure the combustion at high thermal efficiency.

In addition, control of the fuel injection rate at a low output power is facilitated. Without the throttles 3f and 18a, the pressure in the accumulating chamber is low at low output power in accordance with the injection rate, this being indicated by the broken line 0'-1' in FIG. 12.

When the spill port 17 is opened the needle valve 8 opens suddenly (1a-1x) and the pressure in the accumulating chamber drops (1'-2'). When the injection end control valve 13 opens, the needle valve 8 closes gradually (2'x-3'x). During this period the injection rate follows the single-dotted lines 1c-1'y-2'y-3'z, the area bounded by 1c-1'y-2'y-3'z-1c indicating the quantity of the fuel injected.

With the throttles 3f and 17a, however, the needle valve 8 travel is along lines 1a-2'a-3' and the injection rate during this period varies along lines 1c-2'c-3'd; the quantity of the fuel injected indicated by the area bounded by 1c-2'c-3'd-1c, being reduced as a result.

The point 1'y and the broken line 1c-2'c are lower than the point 1y and the line 1c-2c, respectively, because the pressure in the accumulating chamber at the start of injection is lower at the point 1' than at the point 1.

If desired the spill port restriction may be formed in the passage 24a of the plunger 24 by reducing the area thereof or as shown in FIG. 1 to form a restriction or shoulder 24c having an end face 24d. Moreover, the operation and effect of the present invention are not adversely affected despite the fact that the plunger 24 is of the negative lead as in FIG. 5.

When communication between the notch 24b and the spill port 17 is established, the shoulder 24c restricts the flowpath from the passage 24a to the spill port so providing resistance to the flow fuel.

Figure 13:
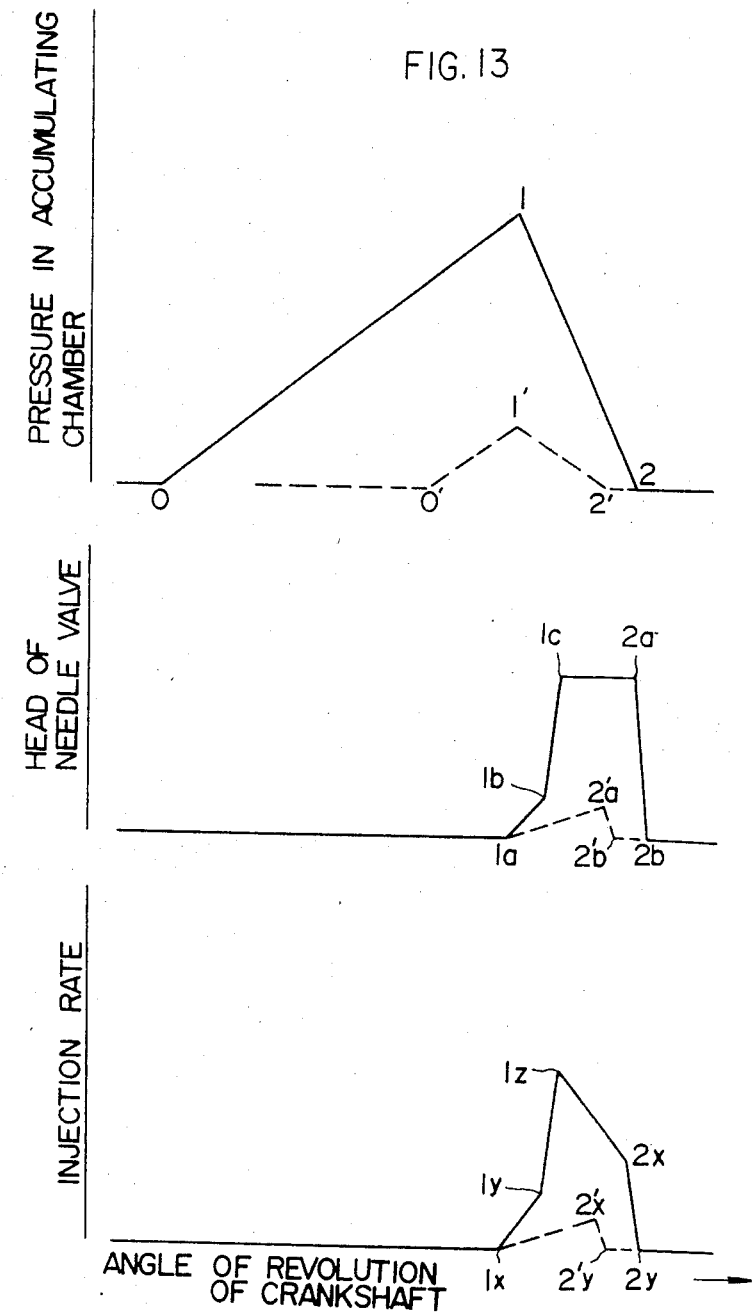

Referring now to FIG. 13, when pressure in the accumulating chamber 12 reaches point 1, communication between the notched face 24b and the spill port 17 is established so that the needle valve 8 begins to open as has been described above.

Due to the resistance provided by the shoulder 24c the needle valve opens slowly following the solid line 1a-1b and the injection rate follows the line 1x-1y.

As the plunger 24 advances spill port 17 is fully opened, the needle valve 8 lifts abruptly. The pressure in the accumulating chamber then drops to point 2 and the injection end control valve 13 opens whereupon the needle valve 8 closes abruptly (2a-2b).

Meanwhile, the injection rate increases abruptly (1y to 1Z) and then decreases gradually (2x-2y).

For the small quantity of the fuel injected, e.g. during the idling operation of the engine, the pressure in the accumulating chamber is raised (0'-1') until the spill port 17 opens. The length of the shoulder 24 is such as to provide a restriction to flow throughout the fuel injection period with the result, that the needle valve opens slowly along the line 1a-2'a. The injection rate is also low (1x-2'x) so that the pressure in the accumulating chamber drops slowly (along 1'-2'). When the injection end control valve 13 opens, the needle valve closes to terminate injection (2'b-2'y).

As has been described hereinbefore, according to the present invention, in the accumulating type fuel injection, the restrictions to the flow of the fuel back through the high-pressure fuel passage while the needle valve is being opened, are disposed downstream (with respect to the reverse flow) of the point where the passage from the injection end control valve communicate with the high-pressure fuel passages. As a result, when large quantities of fuel are to be injected to achieve high output power, the injection rate can be increased to improve the thermal efficiency and to prevent the emission of black smoke whilst maintaining a low initial injection rate with the object of reducing noise, the combustion pressure and the discharge of the nitrogen oxides.

At low output power where small quantities of fuel are to be injected, on the other hand, the injection rate can be reduced to run the engine at low noise, to reduce the minimum fuel injection rate (with the aid of the injection end control valve) and to facilitate adjustment of the fuel injection at the low output power.

The restriction or shoulder 24c need not be cylindrical but may be conical or indded, any shape appropriate to the desired injection rate at any given load.

Another embodiment of fuel injector according to the present invention and shown in FIGS. 14 to 16, has a body 101 and a needle valve housing 102 secured to the body by a nut 103. Within the body is an injection end control valve 105 having a spool 106 slidable within a valve member 104 fixed to the body 101. A spring 108 adjustable by means of a screw 128 vary the opening of the valve, bears upon a spring carrier 107 and biases the injection end control valve 105 toward the open position in which it is shown. A stop 109 limits movement of the valve 105 in the appropriate direction. The adjusting screw 128 is secured by a nut 129, and a screw 30, one end of which forms the stop 109, fastened on the nut 129. The screw 130 is, in turn, secured by a lock nut 131 so that the fuel having leaked from the gap between the aforementioned valve member 104 and the sliding portion 106 of the injection end control valve 105 is returned through a hole 136 in the screw 130 to a fuel tank (not shown). A needle valve control piston 111 is so disposed and biased by a spring 110 as to contact the upper end of a needle valve 120 as to slide in a bore aligned with control valve 105. A high-pressure fuel passage 114 from a fuel inlet 112 for connection to an injection pump, communicates via a throttle 113 in the valve member 104 with the end control valve 105.

A fuel branch passage 115 communicates with a check valve 123 of the aforementioned needle valve control piston 111 (i.e. the atmospheric pressure side of the needle valve 120).

The needle valve 120 has a valve face 119 at its leading end, and a spring bearing shoulder 121. Between the check valve 123 and the shoulder 121 there is interposed a spring 124 by which the needle valve 120 is biased towards a closed position with the valve face 119 in contact with a valve seat 126 formed internally of an injection port 125, (see FIG. 15). In this state a valve face 123a around the upper end of the check valve 123 bears against the lower face of the body so as to shut-off communication between the accumulating chamber 117 and the fuel inlet 114 via passage 115.

The injection end control valve 105 which is shown to an enlarged scale in FIG. 16 is in the open position.

As in previously described embodiments, the injection pump (not shown in FIGS. 14 to 16) is of the kind having a plunger slideable in a barrel, a spill port and a suction return valve in the high-pressure fuel passage.

In operation, a high-pressure fuel is pumped to the fuel inlet 112 of the body 101 from the injection pump some of the fuel passing through the restriction 113 and through the open injection end control valve 105 the passage 118 into the accumulating chamber 117.

When the pressure in the accumulating chamber 117 reaches 1,000 atms, for example, the injection end control valve 105 moves in opposition to spring 108 into the closed position shown in FIG. 16.

Further fuel from the injection pump flows through the high-pressure fuel passage 115 to the atmospheric pressure side of the needle valve 120 so that the check valve 123 is opened by the pressure of fuel acting in oppsition to the spring 124 to admit fuel to the accumulating chamber 117.

The forces then acting on the needle valve 120 are the closing force F=(the force of the spring 110)(the force of the spring 120)+(the area of the sliding portion 122×the pressure) and the opening force F'=((the area of the sliding portion 122)−(the area of the external diameter of the valve face 119))×(the pressure).

As is apparent from the above equations, the force F is greater than the force F', so that the valve face 119 is forced into contact with the valve seat 126 as the pressure in the accumulating chamber rises, so that no fuel is allowed to leak from the injection port 125.

when the injection pump spill port opens, the pressure in the high-pressure fuel passages 114 and 115 drops abruptly due to the action of the suction return valve the pressure acting on the atmospheric pressure side of the needle valve, (in communication with the high-pressure fuel passage 115) also drops but the pressure in the passage 16 and above the needle valve control piston 111 reduces gradually by virtue of the resistance provided by the restriction 113. Once needle valve 120 opens the pressure in the accumulating chamber 117 is also applied to the valve face 119 but, the needle valve does not move abruptly due to the resistance to flow of fuel through the restriction 113.

When the needle valve 120 is opened, i.e. when the valve face 119 leaves the valve seat 126 the fuel in the accumulating chamber 117 is injected therefrom through the injection port 125 into the combustion chamber of the engine.

Initially, the needle valve travel is such as to provide only a restricted opening (between the face 119 and seat 126) for the injection fuel and the result of this restriction is a low fuel injection rate.

Eventually, the fuel above the needle valve control piston 111 flows through the passage 116 and the restriction 113 into the fuel passage 114 (then at low pressure). As the pressure above the control piston 111 drops, the needle valve gradually opens further so that the fuel is injected at a gradually increasing rate.

When the pressure of fuel in the accumulating chamber 117 drops to (e.g.) 1,000 atms, the injection end control valve 105 is opened by the spring 118 admitting the fuel from the accumulating chamber 117 through the passage 119, the injection end control valve 105 and into the chamber above the needle valve control piston 111.

Fuel also flows through the restriction 113 into the fuel passages 114 and 115 (at low pressure) so that rise in pressure applied the atmospheric pressure side of the needle valve 120 by the resistance of the throttle.

Immediately following opening of the injection end control valve 105 the needle valve closing force F=(the force of the spring 110)+((the area of the needle valve control piston 111)+(the pressure in the accumulating chamber 117))+(the force of the spring 124). The needle valve 120 opening force F' on the other hand=(the area of the sliding portion 122 of the needle valve 120)×(the pressure of the accumulating chamber 117).

Hence the resultant force tending to close the needle valve 120 is given by:

(the force of the spring 110)+((the area of the needle valve control 111−the area of the sliding portion 122 of the needle valve 120)×(the pressure in the accumulating chamber 117))+(the force of the spring 124).

More specifically, the needle valve 120 is accelerated, toward the closed position not only by the springs 110 and 124 as in the embodiments of FIGS. 1 to 6, but also by the pressure in the accumulating chamber 117 which is applied to the upper face of the needle valve control piston 111 having a larger diameter than that of the sliding portion 122 so that the valve is closed at a high speed and within a remarkably short time period. This shortening of the fuel injection period enables combustion at high thermal efficiency.

The operation is further illustrated by the graphs in FIG. 21.

When the pressure in the accumulating chamber 117 reaches point 1 the injection pump spill port opens whereupon the pressure in the fuel passages 114 and 115 drops abruptly.

In an injector such as shown in FIG. 1 (i.e. without the needle valve control piston 111 and the restrictionn 113), the abrupt drop in the pressure acting on the atmospheric side of the needle valve 120 would cause abrupt opening of the needle valve 120 (to a point 1x) and this injection rate changes as indicated from zero (1c) to a point 1y. After that, as the pressure in the accumulating chamber 117 drops gradually (along the line 1-2) the injection rate also drops gradually (1y-2z).

The result of such a high initial injection rate is rapid combustion of the fuel so that the engine generates a great deal of noise, the combustion temperature increases and large quantities of nitrogen oxides are emitted.

Figure 8:
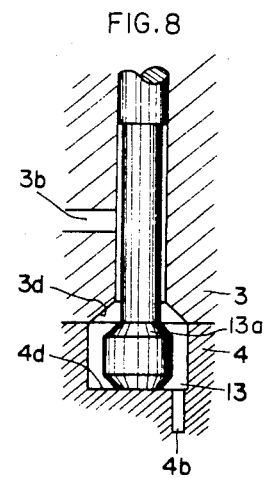
FIGS. 8 to 10 each show to an enlarged scale a port of the injector of FIG. 7.
Figure 9:
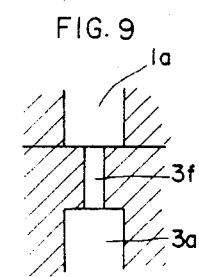
Figure 10:
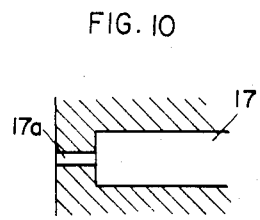
Figure 11:
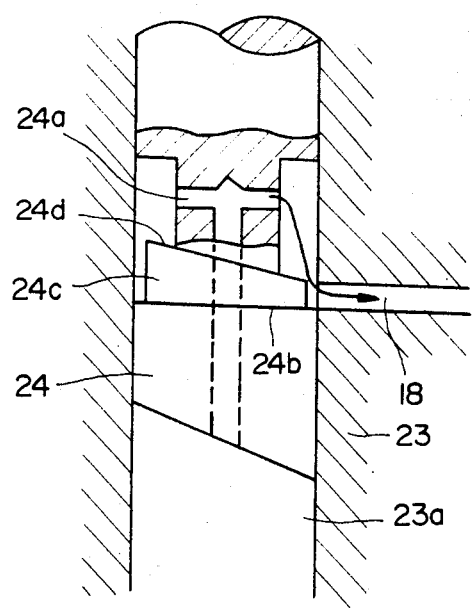
FIG. 11 illustrates an alternative spill port throttle arrangement.

The needle valve control piston 111 and the restrictor 113, however, enables opening of the needle valve 120 to be controlled, as indicated by the line 1a-2a in FIG. 8.

At low needle valve travel the injection rate is low initially (1c-2c) and increases with increased travel of the needle valve 120. This is advantageous as has been explained with reference to earlier embodiments shown in FIGS. 7 to 13.

At the end of the injection period, the needle valve of an injector such as shown in FIG. 1 closes along lines 2a-3x, and the injection rate during this period foolows the line 2z-3z.

In the present embodiment, having the needle valve control piston 111 and the throttle 113, the valve closing speed is higher, for the reasons set out above, and as indicated by the line 2a-3. Also, the injection rate falls off more rapidly as indicated by line 2c-3c.

At low output power, the pressure in accumulating chamber 117 is lower as indicated by a broken line 0'-1' in FIG. 21, and in the FIG. 1 embodiment, the needle valve 120 opens abruptly (along 1a-1x) and the pressure in the accumulating chamber drops (along 1'-2') as injection proceeds. At point 2' the injection end control valve 105 opens whereupon the needle valve 120 closes gradually (along 2'x-3'x). The injection rate follows the single dotted lines 1c-1'y-2'y-3'z, and the area defined thereby representing the quantity of fuel injected.

In this embodiment (FIG. 16), on the other hand, the needle valve travel is as indicated by the broken lines 1a-2'a-3 and the injection rate is indicated by the broken lines 1c-2'c-3'd.

The reason that the injection rate 1'y is lower than the rate 1y and the broken line 1c-2'c is lower than the solid line 1c-2c is that the pressure in the accumulating chamber 117 at the start of injection is lower at the point 1' than at the point 1.

A comparison of the areas bounded by 1c-1'y-2'y-3'z-1c and 1c-2'c-3'd-1c demonstrates a reduction in the minimum fuel injection.

Figure 17:
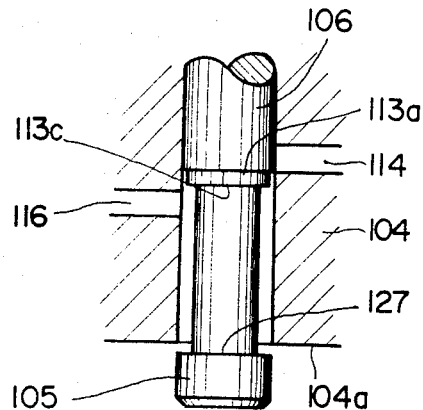
FIGS. 17 to 19 illustrate the operation of an alternative spill port throttle arrangement.
Figure 19:
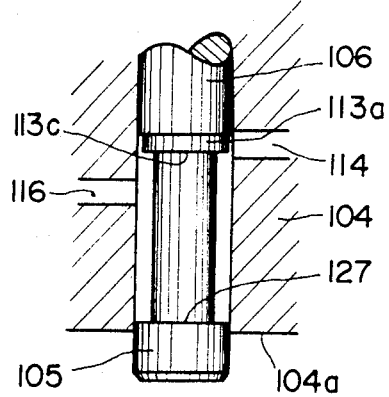
Figure 18:
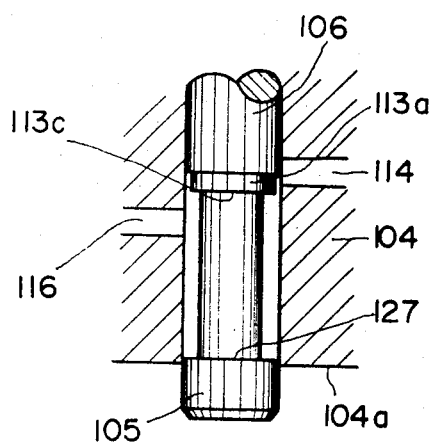

In a modified embodiment shown in FIGS. 17 to 19, the spill port restriction is provided by a shoulder 113a formed on the spool 106 of the injection end control valve 105. For lower power, the pressure of fuel accumulated in the chamber 117, is so low that the injection end control valve 105 is in the open position shown in FIG. 18 immediately before injection begins, so that the fuel flowing back along the passage 116, is restricted by the shoulder 113a so that opening of the needle valve 120 is slowed down and a low initial injection rate is achieved.

For high output power, however, the pressure in the accumulating chamber 117 is high so that immediately before the start of injection, the injection and control valve 105 is in the position shown in FIG. 19. Hence the shoulder 113a offers less resistance to the back flow of fuel along passage 116 so that the valve opens more quickly.

When the pressure in the accumulating chamber 117 drops below a predetermined value (during injection of fuel, the injection end control valve 105 opens as illustrated in FIG. 17. The dimensions and arrangement of the valve are selected such that the high-pressure fuel passage 114 is closed by the spool portion 106 when the injection end control valve 105 is open. As a result, fuel from the accumulating chamber 117 flowing through the passage 116 into the needle valve control piston 111 is prevented from flowing into fuel passage 114. Hence, the chamber below the needle valve control piston 111 communicating with the passage 114 via the passage 115 remains at low pressure whereby a high pressure differential is applied across the needle valve control piston 111 to achieve rapid closure of the valve.

Figure 20:
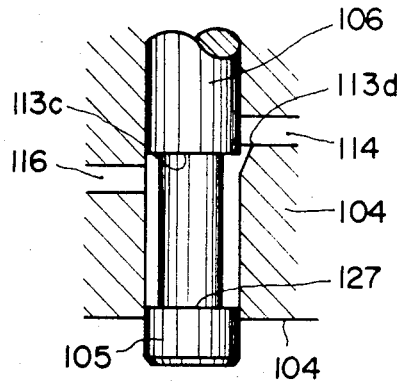
FIG. 20 shows yet another spill port arrangement.

An alternative spill port restriction shown in FIG. 20 comprises a relieved portion 113d of the valve member 104, adjacent the spill port.

FIG. 22 illustrates the operation of an injector having a spill port arrangement of FIGS. 17 to 19.

When the pressure in the accumulating chamber reaches 1, the needle valve opens to start the injection of the fuel. At this time, the injection end control valve 105 is closed, as shown in FIG. 6, and the area between the shoulder 113a and the high-pressure fuel passage 114 is relatively large. The needle valve 120 opens along 1a-1x at which the needle valve 120 reaches its maximum travel. During this period the injection rate follows the line (1c-1y).

If the pressure in the accumulating chamber 117 drops to point 2, the injection end control valve 105 opens so that the needle valve 120 closes (2a-3).

The injection rate drops gradually (1y to 2x) with pressure in the accumulating chamber 117 and falls off (2x-3z) abruptly at the point 2. While the engine is idling, little fuel is needed and the pressure in the accumulating chamber 117 rises to a lesser extent (0'-1') and the injection end control valve 105 is held by the pressure in the position shown in FIG. 18 so that flow to the fuel passage 114 is restricted by the shoulder 113a. The needle valve 120 opens slowly (1'-2') so that the injection end control valve 105 opens and the needle valve 120 closes (3'-3'z).

The provision, in an accumulating type fuel injector of a needle valve control piston 111 having a larger area than that of the shaft portion 122 of the needle valve 120 and disposed in contact with the atmospheric pressure side of the needle valve 120, and the restriction 113 for providing resistance to the flow of fuel between the injection end control valve 105 and the high-pressure fuel passage 114, increases the injection rate at the high output power for the high fuel injection rate to improve the thermal efficiency and to prevent black smoke from being emitted. In addition, the initial injection rate can be reduced to void high combustion pressure and the emission of the nitrogen oxides.

At a low output power for the low fuel injection rate, on the other hand, the injection rate can be reduced to minimise engine noise. Also, the minimum fuel injection can be reduced with the aid of the injection end control valve 105, the needle valve control piston 111 and the throttle 113.

The shoulders 113a (shown in FIGS. 17 to 19) and 124c (FIG. 11) need not be cylindrical but may be conical or any other suitable for changing the injection rate in accordance with the load applied.

Similarly the shape of the relieved portion 113d shown in FIG. 20 need not have its shape limited if it changes the injection rate in accordance with the load applied.

I claim:

1. A fuel injector for use with a compression ignition engine and a source of fuel, said fuel injector comprising:

a pump in connection with said source of fuel for urging fuel from said source toward said engine, said pump comprising a spill port for producing a reduction in the pressure produced by said pump;

a suction return valve in communication with said pump and comprising spring means for urging said suction return valve into a closed position in response to the reduction in pressure produced by said spill port;

an injection port in communication with said engine;

injection valve means movably mounted adjacent said injection port for alternately opening and closing the injection port;

biasing means for urging the injection valve means into position for closing the injection port;

a first fuel passage in communication with said suction return valve and with said injection valve means such that fuel in said first fuel passage urges the injection valve means into position for closing the injection port and such that the pressure of fuel in said first fuel passage is reduced in reponse to the closing of the suction return valve;

a second fuel passage in communication with said first fuel passage;

an accumulating chamber in communication with said second fuel passage and with said injection valve means such that fuel in said accumulating chamber urges said injection valve means into position for opening the injection port; and an injection end control valve in said second fuel passage and being movable to alternately permit or block the flow of fuel through the second fuel passage, said injection end control valve including spring means for urging said injection end control valve toward an opened position, said injection end control valve being operative only in response to forces of said spring means and to pressure of the fuel and being substantially free of direct mechanical interaction with other moving members of the fuel injector and the engine so as to close when the pressure of fuel in the accumulating chamber reaches a pre-determined level and to open when the pressure of fuel in the accumulating chamber falls below said pre-determined level, whereby when the pressure of fuel in the first fuel passage drops in response to the closing of the suction return valve, the fuel from said accumulating chamber opens the injection valve means to inject the fuel into the engine, and whereby when the pressure of fuel in the accumulating chamber falls below said pre-determined level, the injection end control valve opens allowing fuel from said accumulating chamber to flow to said first fuel passage and abruptly terminate the injection of fuel into the engine.

* * * * *